(12) United States Patent
Huang et al.

(10) Patent No.: US 9,681,294 B2
(45) Date of Patent: *Jun. 13, 2017

(54) METHOD FOR MANAGING LOCAL TERMINAL EQUIPMENT ACCESSING A NETWORK

(75) Inventors: Yingxin Huang, Beijing (CN); Wenlin Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 63 days.

This patent is subject to a terminal disclaimer.

(21) Appl. No.: 13/480,497

(22) Filed: May 25, 2012

(65) Prior Publication Data

US 2012/0276874 A1   Nov. 1, 2012

Related U.S. Application Data

(63) Continuation of application No. 10/591,151, filed as application No. PCT/CN2005/000891 on Jun. 21, 2005, now Pat. No. 8,208,898.

(30) Foreign Application Priority Data

Jun. 25, 2004   (CN) .......................... 2004 1 0049883

(51) Int. Cl.
| | | |
|---|---|---|
| H04M 1/66 | (2006.01) | |
| H04M 1/68 | (2006.01) | |
| H04M 3/16 | (2006.01) | |
| H04W 12/06 | (2009.01) | |
| H04W 12/08 | (2009.01) | |
| H04L 29/06 | (2006.01) | |
| H04W 8/26 | (2009.01) | |
| H04W 74/00 | (2009.01) | |
| H04W 88/02 | (2009.01) | |
| H04W 84/12 | (2009.01) | |

(52) U.S. Cl.
CPC ............ *H04W 12/06* (2013.01); *H04L 63/102* (2013.01); *H04L 63/162* (2013.01); *H04W 12/08* (2013.01); *H04L 63/0853* (2013.01); *H04W 8/26* (2013.01); *H04W 74/00* (2013.01); *H04W 84/12* (2013.01); *H04W 88/02* (2013.01)

(58) Field of Classification Search
CPC ..... H04W 12/12; H04W 12/06; H04W 8/183; H04W 4/14; H04W 80/04; H04W 84/12; H04L 29/08108; H04L 2012/5607; H04B 1/3816
USPC ......... 455/410, 411, 414.1, 432.1, 466, 558; 370/310.2, 328, 338
See application file for complete search history.

*Primary Examiner* — Steve D Agosta
(74) *Attorney, Agent, or Firm* — Slater Matsil, LLP

(57) ABSTRACT

Methods for managing a local Terminal Equipment (TE) accessing a network are provided. In accordance with this disclosure, the MT will not send the key(s) information to the TE until having received a notice of successful authentication from the TE or having decided that the message forwarded by the TE is a response message of successful authentication, which makes the procedure more reasonable and saves the network resources the method further includes a management list containing the identities of local TEs on the basis of the modified procedure.

4 Claims, 4 Drawing Sheets

METHOD FOR MANAGING LOCAL TERMINAL EQUIPMENT ACCESSING A NETWORK

CROSS-REFERENCE TO RELATED APPLICATIONS

This application is a continuation of U.S. application Ser. No. 10/591,151, filed on Nov. 13, 2007, which is a national stage of international application No. PCT/CN2005/000891, filed on Jun. 21, 2005. The international application claims priority to Chinese patent application No. 200410049883.1, filed on Jun. 25, 2004. The afore-mentioned patent applications are hereby incorporated by reference in their entireties.

FIELD OF THE INVENTION

The present invention relates to wireless access technologies, and in particular, to methods for managing a local Terminal Equipment (TE) accessing a network.

BACKGROUND OF THE INVENTION

Along with the development of the society, users are expecting higher and higher rates of wireless access. As a Wireless Local Area Network (WLAN) is able to provide high-rates for wireless data access in a relatively small area, there has been wide application of the WLAN. Various techniques have been used in the WLAN, among which a technical standard with more application at present is IEEE 802.11b. This standard involves the frequency band of 2.4 GHz with a data transmission rate up to 11 Mbps. Other technical standards involving the same frequency band include IEEE 802.11g and the Bluetooth, where the data transmission rate of IEEE 802.11g is up to 54 Mbps. There are other new standards of the WLAN, such as IEEE 802.11a and ETSI BRAN Hiperlan2, which use the frequency band of 5 GHz with the transmission rate up to 54 Mbps as well.

Although there are various techniques for wireless access, most the WLAN utilize IP data packets for the data transmission. The specific WLAN access technique adopted by a wireless IP network is usually transparent to the upper-level of the IP network. Such a network is usually configured with Access Points (AP) for implementing wireless access of User Equipment (UE) and with IP transmission network which consists of network controlling and connecting devices for implementing the data transmission.

Along with the emergence and development of the WLAN, focus of research is shifting to the inter-working of the WLAN with various wireless mobile communications networks, such as Global System for Mobile communications (GSM), Code Division Multiple Access (CDMA), Wideband Code Division Multiple Access (WCDMA), Time Division-Synchronous Code Division Multiple Access (TD-SCDMA), and CDMA2000. In accordance with the 3rd Generation Partnership Project (3GPP) standards, the UE is able to connect via the access network of the WLAN with not only the Internet and Intranets but also the 3GPP home network and 3GPP visited network.

FIG. 1 is a schematic diagram illustrating the networking architecture of a WLAN inter-working with a 3GPP system under roaming circumstances. When a WLAN UE tries to get accessed under roaming circumstances, it will get connected with a 3GPP visited network via a WLAN access network. As some entities of the 3GPP visited network are inter-connected with corresponding entities of the 3GPP home network, for instance, a 3GPP Authentication, Authorization, Accounting (AAA) proxy in the visited network is connected with a 3GPP AAA server in the home network, a WLAN Access Gateway (WAG) in the visited network is connected with a Packet Data Gateway (PDG) in the home network, and etc., the WLAN UE is able to get accessed to the 3GPP home network. The shadow part of FIG. 1 shows the configuration for the service of 3GPP Packet Switch (PS) domain, i.e., the inter-working service of Scenario 3 in a 3GPP network.

FIG. 2 is a schematic diagram illustrating the networking architecture of a WLAN inter-working with a 3GPP system under non-roaming circumstances. When getting accessed locally, a WLAN UE will get connected directly to a 3GPP home network via a WLAN access network. The shadow part of FIG. 2 shows the configuration for the service of a 3GPP PS domain, i.e., service of Scenario 3 in a 3GPP home network.

As shown in FIG. 1 and FIG. 2, a 3GPP system primarily includes Home Subscriber Server (HSS)/Home Location Register (HLR), 3GPP AAA server, 3GPP AAA proxy, WAG, PDG, Charging Gateway (CGw)/Charging information Collecting Function (CCF) and Online Charging System (OCS). A user equipment, a WLAN access network, and all the entities of the 3GPP system together constitute a 3GPP-WLAN inter-working network, which can be used as a WLAN service system. In this service system, the 3GPP AAA server is in charge of the authentication, authorization, and accounting of a user, collecting the charging information sent from the WLAN access network and transferring the information to the charging system; the PDG is in charge of the transmission of the user's data from the WLAN access network to the 3GPP network or other packet data networks; and the charging system receives and records the user's charging information transferred from the network while the OCS instructs the network to make periodical transmission of the online charging information in accordance with the expenses of the online charged users, makes statistics and conducts control.

The UE, on the other hand, primarily includes the TE, e.g., a lap-top computer; an Mobile terminal (MT), e.g., a cellular phone of a user; and a user identity card, e.g., a GSM Subscriber Identity Module (SIM), a 3G Universal Subscriber Identity Module (USIM), or an IP Multimedia Subsystem (IMS) SIM (ISIM), which is typically used by being inserted in a cellular phone.

In a hot area covered by the WLAN, after passing authentication and receiving authorization via the USIM/SIM in a cellular phone of the user, such a TE as the lap-top of a user may access an inter-working network of the WLAN and the 3GPP/3GPP2 system and use the Internet or the PS domain network of the 3GPP/3GPP2 system.

As the authentication and authorization processes using the USIM, SIM, or ISIM are much alike, the specific process of the TE accessing the network is hereinafter described by taking the USIM as an example. FIG. 3 is a schematic diagram illustrating a flowchart of a TE accessing the network using an USIM in the prior art.

Step 301: When having accessed the network and desiring to use a service in the network, the TE will receive an authentication request identity message sent from the network side. Since the identity of the TE itself is not a subscriber identity accepted in the 3GPP/3GPP2 network, the TE will link with a nearby cellular phone, i.e., an MT, via a local transmission protocol, such as the Bluetooth or an infrared interface so as to use the USIM in the MT as the identity of itself, i.e., the account, for accessing the network.

The above-said local transmission protocol refers to a short-distance transmission protocol, i.e., a transmission protocol only effective when the receiver and the transmitter are within a short distance, for example, the Bluetooth or the infrared interface. In other words, only when the distance between the TE and the MT is short will the local transmission protocol be effective, when the TE is relatively far from the MT, the local transmission protocol can not be used, i.e., the local transmission protocol is ineffective in that case, and it is the same below.

Step 302: After a link is set up between the TE and the MT via the local transmission protocol, the TE will forward the authentication request identity message from the network side to the MT.

Step 303: the MT acquires from the USIM the information of the user status identity accepted by the 3GPP/3GPP2 network, the identity includes International Mobile Subscriber Identity (IMSI) or International Mobile Person Identity (IMPI), or a temporary user's status identity named pseudonym assigned by the 3GPP/3GPP2 network.

Step 304: the MT sends to the TE a response message containing the identity by means of the local transmission protocol.

Step 305: the TE forwards to the network side the acquired response message containing the identity.

Step 306: the network side generates an authentication vector based on the received identity, and sends to the TE an authentication request containing the authentication vector.

Step 307: the TE forwards the authentication request containing the authentication vector to the MT.

Step 308: after receiving the authentication request containing the authentication vector, the MT asks the USIM to make calculation based on the authentication vector so as to detect the validity of the network; after the detection has passed, the MT acquires the information of authentication response value and key(s) from the calculation result of the USIM.

Step 309: the MT returns an authentication response message containing the authentication response value to the TE.

Step 310: the TE returns the authentication response message containing the authentication response value to the network side.

Step 311: the network side checks whether the authentication response value matches itself, if yes, sends a message of successful authentication to the TE and allows the TE to access the network, otherwise sends a message of failed authentication to the TE and rejects the request of the TE to access the network; meanwhile, the MT sends the information of key(s) to the TE such that the key(s) could be used by the TE when the TE accesses the network.

In the example mentioned above, the protocol of EAP (Extensible Authentication Protocol) is employed in the application layer between the network side, the TE and the MT while the interface protocol of 3GPP/3GPP2 between a terminal and a card is used between the MT and the USIM.

As can be seen from the above procedure, in the process of the TE making authentication and accessing the network via the MT using the USIM, as it is impossible to manage the TE that employs the MT, the resources of the MT are likely to be illegally utilized, which will lead to the loss of users' funds and inconvenience in the daily use of users.

In addition, in Step 311 above, the process of the network side sending the authentication result to the TE occurs at the same time of the MT sending the information of key(s) to the TE without a binding mechanism between the two processes, which causes a waste of the network resources.

SUMMARY

In view of the above, this invention provides a method for managing a local TE accessing a network so as to manage the TE that accesses the network using the resources of a MT. This invention also provides a method for managing a local TE accessing a network so as to optimize the management procedure and provides guarantee in message flow for the MT managing the TE accessing the network.

The technical solution of this invention is as follows:

A method for managing a local TE accessing a network, with a management list including the identities of the local TEs configured in an MT and a user identity card inserted in the MT, the method including the steps of:

upon receiving an authentication request identity message containing the identity of and from the local TE, the MT decides according to the identities information of the TEs in the management list whether to accept the request; if a decision is made to accept the request, the MT acquires the identity of the user identity card and returns the identity to the TE, the TE accesses the network using this identity, and the procedure is over; otherwise, refuses to return the identity of the user identity card to the TE, and terminates the procedure.

A method for managing a local TE accessing a network, with a user identity card inserted in an MT, including the steps of:

upon receiving an authentication request identity message from the TE, the MT requires the identity of the user from the identity card, sends the identity to the TE, the TE performs the authentication with the network;

deciding whether the authentication is successful, if the authentication is successful, the MT sends key(s) information to the TE, and the TE accesses the network using the received the key(s) information, otherwise terminates the procedure.

In accordance with this invention, the management list containing the identities of local TEs is set in the MT, and whether to accept the request message from the TE is decided according to the information in the management list. In this way, the management of local TEs accessing the network using the resources of the MT is implemented, functions of the MT are improved, and at the same time, the security of user accounts is enhanced and loss of funds avoided. In accordance with this invention, a user is able to define the authority of use for the TE to access while being able to learn the current state of the TE, which makes the user's daily use convenient. In addition, improvement is made on the existing procedure such that the MT will not send the key(s) information to the TE until having received a notice of successful authentication from the TE, which makes the procedure more reasonable and saves the network resources.

Alternatively, in accordance with this invention, the existing procedure can be improved on the basis of not setting a management list of the identities of local TEs, i.e., on the basis of the prior art. In the improved procedure, the MT will not send the key(s) information to the TE until having received a notice of successful authentication from the TE or having decided that the message forwarded from the TE is a response message of successful authentication, which makes the procedure more reasonable and saves the network resources. Furthermore, with a management list of the identities of local TEs set in the MT on the basis of the improved procedure, the management of the TE that accesses a network using the resources of the MT can be better implemented.

DETAILED DESCRIPTION OF THE INVENTION

This invention is hereinafter further described in detail with reference to the accompanying drawings and a specific embodiment.

Briefly, the method of this invention includes the following steps: setting a management list containing identities of local TEs in an MT, and deciding whether to accept a request message from a TE based on the information in the management list so as to implement management of the TE that accesses a network using resources of the MT. The method improves the existing procedure to make it more reasonable and saves the network resources.

Figure 1:
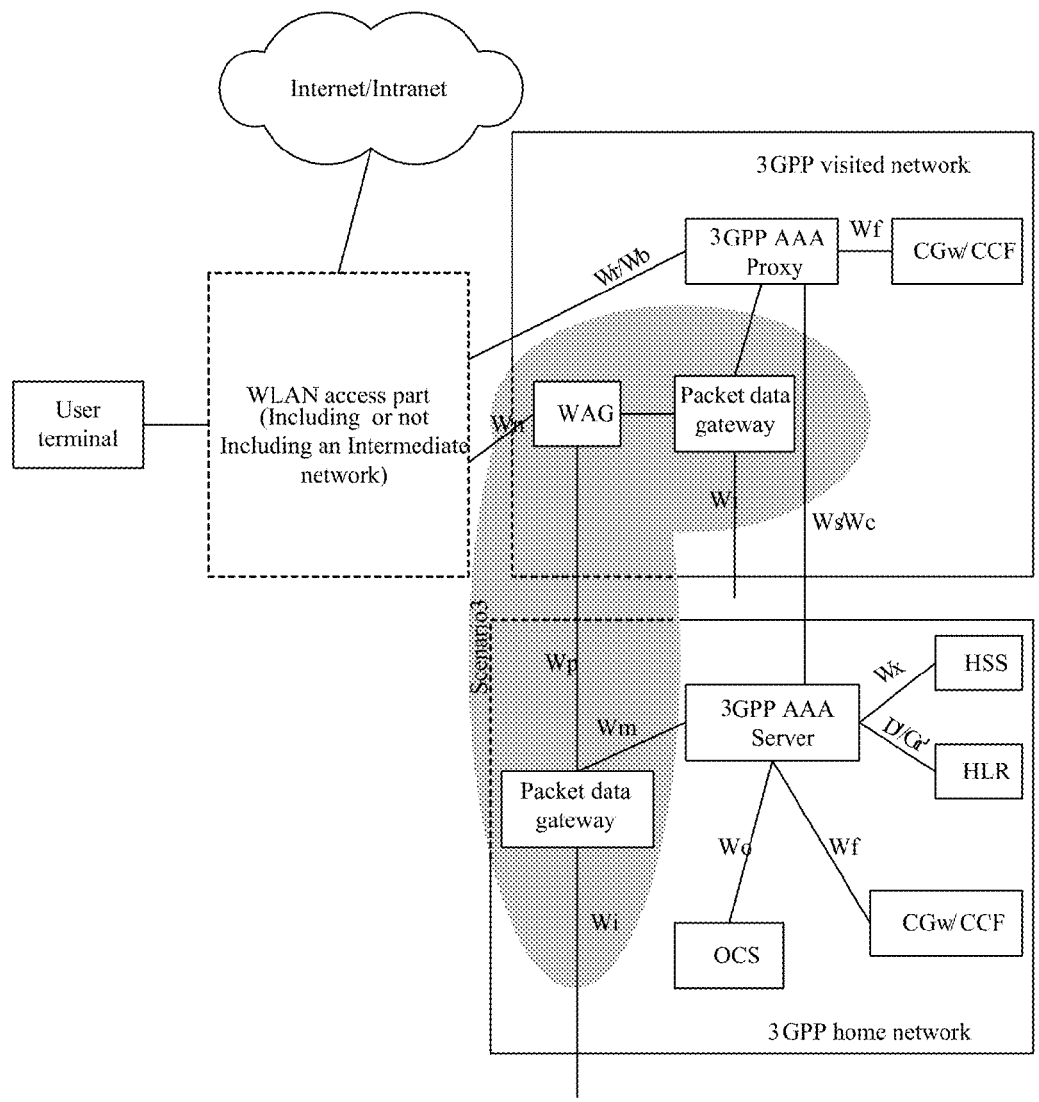
FIG. 1 is a schematic diagram illustrating the networking architecture of a WLAN inter-working with a 3GPP system under roaming circumstances.
Figure 2:
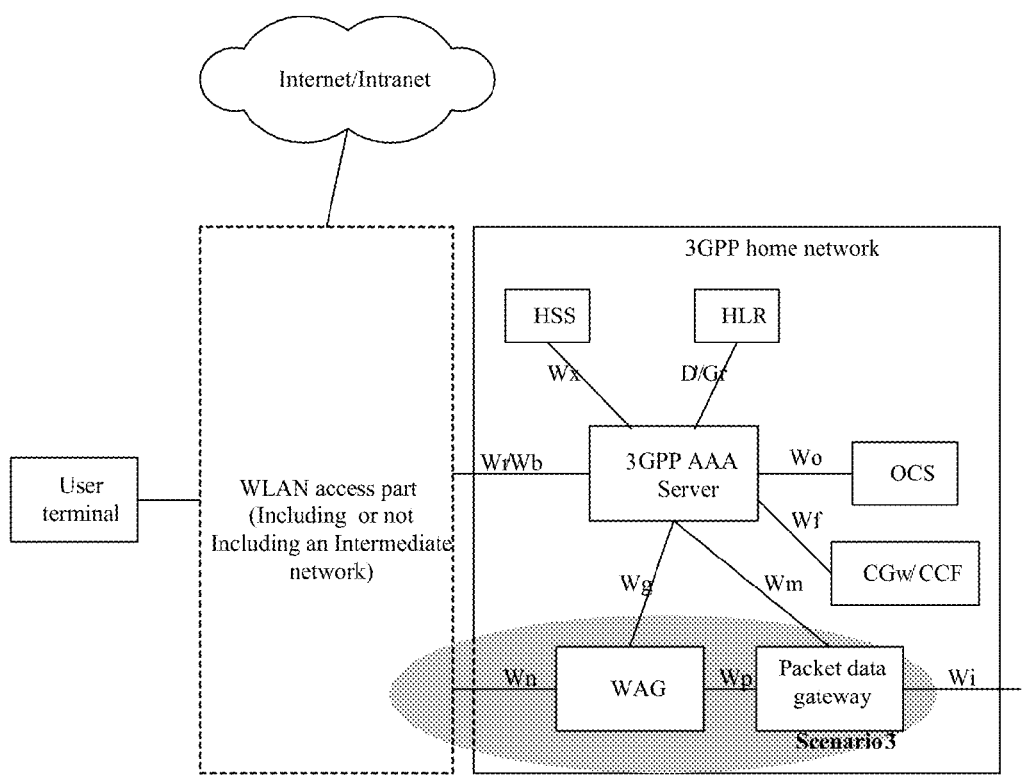
FIG. 2 is a schematic diagram illustrating the networking architecture of a WLAN inter-working with a 3GPP system under non-roaming circumstances.
Figure 3:
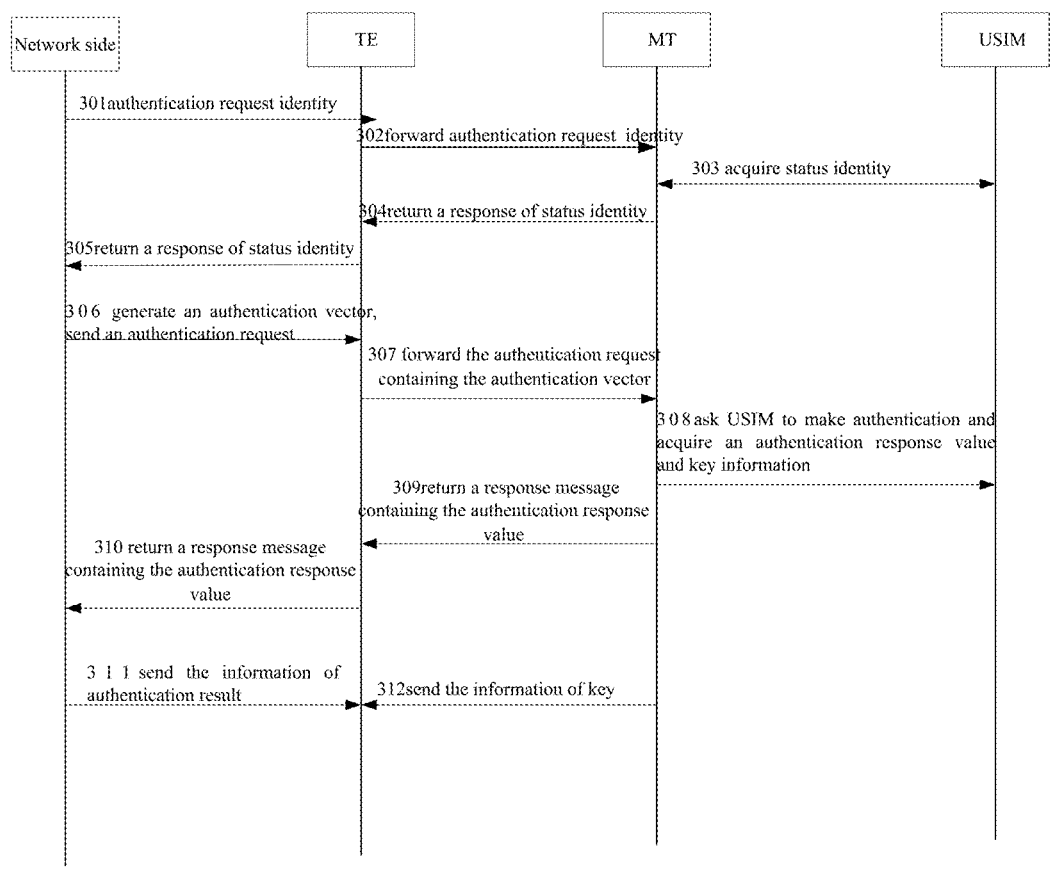
FIG. 3 is a flowchart in the prior art for a TE to access a network using an USIM.
Figure 4:
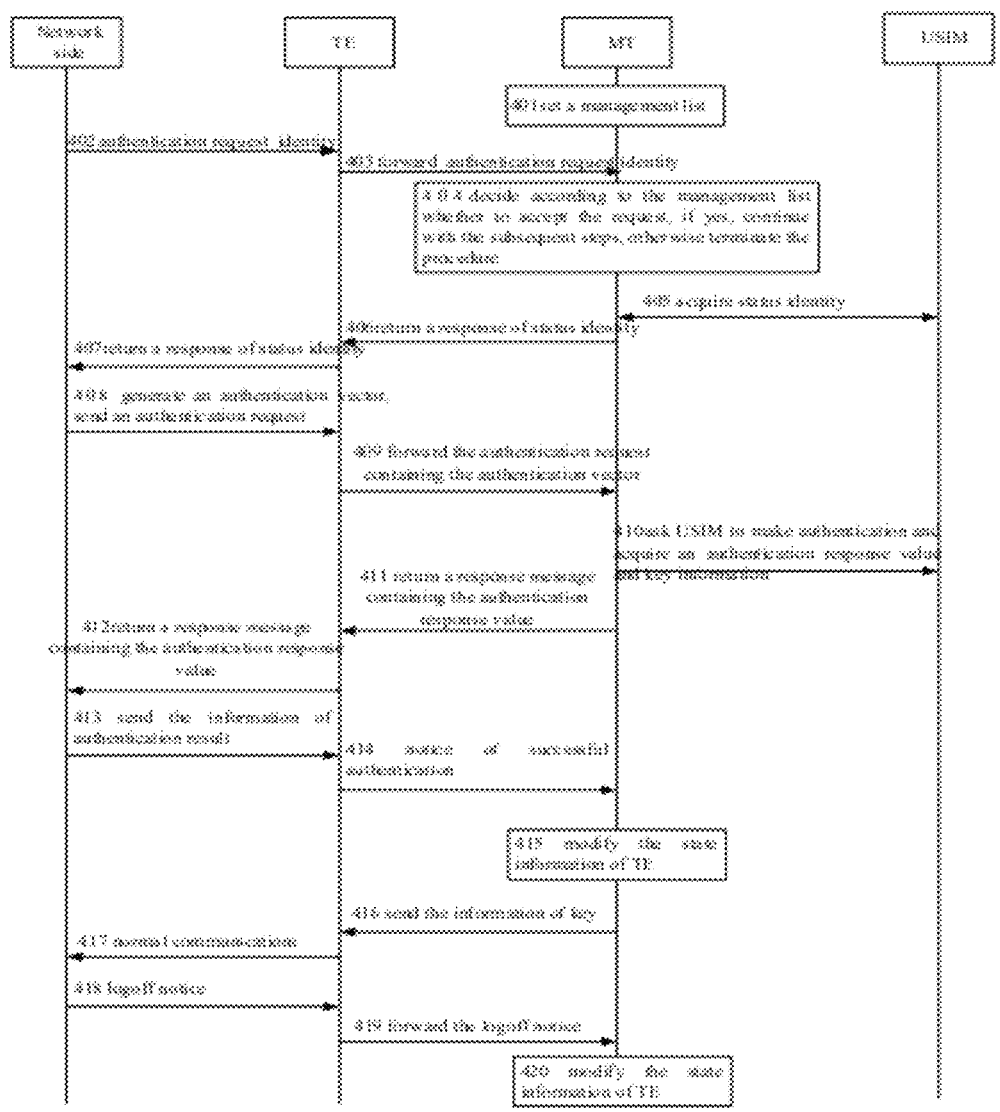
FIG. 4 is a flowchart of an embodiment in accordance with this invention for a TE to access a network using an USIM.

Hereinafter, take the USIM as an example to specifically describe the process of a TE accessing a network. FIG. 4 shows the flowchart of an embodiment in accordance with this invention for a TE to access a network using an USIM.

Step 401: Setting in an MT a management list containing the identities of local TEs.

The management list may be a management list of TEs allowed to access, or may be a management list of TEs forbidden to access, or may be a management list including the list of TEs allowed to access and the list of TEs forbidden to access. In this embodiment, supposing that the management list in the MT includes the list of TEs allowed to access and the list of TEs forbidden to access.

Furthermore, the authority information for the TE to access the network is set in the list of TEs allowed to access in this embodiment so as to indicate whether the network that the TE may access via the WLAN is an Internet or a PS domain service of the 3GPP/3GPP2, i.e., to identify the class of the services that the TE is allowed to use, because the charging rates for the two accessing services are different, wherein the former is lower and the latter is relatively high.

Meanwhile, the state information of the TE accessing the network is further set in the list of the TEs allowed to access in this embodiment so as to identify which TE are in the online state and which TE are in the idle state. In this way, if the network allows only a limited number of the TEs to set up communication connection using one MT, the MT can cooperate with the appropriate management according to the state information of the TEs in the management list. For example, supposing that the network only allows one MT to provide service for one TE, and there has been one TE which is in the in-use state, then if receiving a connecting request from other TE at this time, the MT may directly refuse to provide the service.

There may be multiple above-said management lists in the MT, and each list corresponds to one USIM, ISIM or SIM (USIM/ISIM/SIM) card. This is because each USIM/ISIM/SIM has one user status identity. When a user uses the MT, i.e., a mobile phone, of another person, the user's own USIM/ISIM/SIM card may be inserted in consideration of fee. At this time, only that there is a different management list corresponding to a different USIM/ISIM/SIM card will it be possible to differentiate different users so as to make the management reasonable. Only the user who knows the PIN of the mobile phone will be able to manage all the management lists while other users are only able to manage the management lists associated with their own USIM/ISIM/SIM, respectively.

Step 402: When trying to access a network and desiring to use a service in the network, the TE will receive an authentication request identity message sent from the network side. As the identity of the TE itself is not a user status identity accepted in the 3GPP/3GPP2 network, the TE has to link to a nearby mobile phone, i.e., the MT, via the local transmission protocol, such as the Bluetooth or infrared interface, so as to use the identity of the USIM in the MT as its own identity, i.e., the account, for accessing the network.

Step 403: after a link is set up via the local transmission protocol between the TE and the MT, the TE forwards the authentication request identity message from the network side to the MT. This forwarded message contains the identity of the TE.

When forwarding the message to the MT, the TE also needs to identify whether the authentication request is for ordinary Internet services or for the PS domain services of the 3GPP/3GPP2 system, i.e., to identify the information of the required accessing authority. It is preferred that the TE does not put the information of the authority identifier directly in the authentication request identity message sent from the network because it is necessary to keep this message brief. The TE may put the information of the authority identifier in the local transmission protocol used during the forwarding process, e.g., in the Bluetooth protocol.

Step 404: the MT, upon receiving the authentication identity request, performs the following operation according to the identity of the TE in the request:

Deciding whether the TE is in the list of TEs allowed to access, if yes, perform Step ii, otherwise deciding whether the TE is in the list of TEs forbidden to access, if yes, the MT just rejects the request of the TE and terminates this procedure. In neither of the above cases, i.e., the identity of the TE is not in the list of TEs allowed to access, nor is the identity in the list of TEs forbidden to access, make the processing as follows:

directly reject the request of the TE according to the pre-configuration, for example, the user sets a state of no disturbing, then the UE will not prompt the user in any way, instead, the UE will directly reject the request of the TE and terminates the procedure;

prompting the user by means of sound or in other ways, and deciding whether to return the identity of the user identity card to the TE according to the user's policy, if it decided to return the identity of the user identity card to the TE, go to Step 405; if it is decided not to return the information, terminate the procedure;

the MT decides whether the authority information identified for the TE in the received request message is consistent with the authority information of the TE in the list of TEs allowed to access, if yes, accept the request and perform Step 405, otherwise reject the request of the TE and terminate the procedure.

Step 405: the MT acquires from the USIM the information of the user status identity in the 3GPP/3GPP2 network, which is the IMSI or the pseudonym assigned by the 3GPP/3GPP2 network.

Step 406: the MT sends to the TE via the local transmission protocol a response message containing the identity.

Step 407: the TE forwards to the network side the acquired response message containing the identity.

Step 408: the network side generates an authentication vector based on the received identity, and sends to the TE an authentication request containing the authentication vector.

Step 409: the TE forwards to the MT the authentication request containing the authentication vector.

Step 410: upon receiving the authentication request containing the authentication vector, the MT asks the USIM to make calculation based on the authentication vector so as to detect the validity of the network; upon passing the detection, the MT acquires the information of authentication response value and key(s) from the calculation result of the USIM.

Step 411: the MT returns to the TE an authentication response message containing the authentication response value.

Step 412: the TE returns the authentication response message containing the authentication response value to the network side.

Step 413: the network side checks whether the authentication response value matches itself, if yes, sends a message of successful authentication to the TE and allows the TE to access the network, otherwise sends a message of failed authentication to the TE and refuses the request the TE to access the network.

Step 414: the TE decides whether the received message is a message of successful authentication or a message of failed authentication, if it is a message of failed authentication, just terminate the procedure, and send no information to the MT, otherwise send a notice of successful authentication to the MT.

Step 415: upon receiving the notice of successful authentication, the MT will modify the current state information of the TE in the list of TEs allowed to access if the TE initiating the request is in the list of TEs allowed to access, i.e., marking the TE as currently online; if the TE initiating the request is not in the list of TEs allowed to access, directly perform Step 416.

Step 416: the MT sends the key(s) information to the TE such that the key(s) could be used by the TE when accessing the network.

Step 417: the TE sets up connection with the network side and carries out normal communications.

Step 418: when the service communications between the TE and the network has ended, the network side sends a logoff notice to the TE.

Step 419: the TE forwards the received logoff notice to the MT. The logoff notice contains the information about the type of the authority to be logged off, i.e., indicating whether a 3GPP/3GPP2 PS domain service or a common Internet service is logged off such that the MT could know whether the TE has completely ceased using this account to carry out communications.

Step 420: upon receiving the notice of logoff, the MT will modify the current state information of the TE in the list of TEs allowed to access if the TE initiating the request is in the list of TEs allowed to access, i.e., marking the TE as currently idle; if the TE initiating the request is not in the list of TEs allowed to access, directly terminate the procedure.

Alternatively, in Step 414, upon receiving the authentication response message returned from the network side, the TE may not decide whether the received message is a message of successful authentication or failed authentication, instead, the TE may forward the received authentication response message to the MT directly, and the MT will make the decision, i.e., in Step 415, the MT first makes a decision based on the received authentication response message, if it decided that the received message is a message of successful authentication, continuing with the subsequent operation, if it decided that the received message is a message of failed authentication, make no further operation and just end the procedure.

In the above embodiment, while adding the function to the MT, the procedure is slightly modified, i.e., the key(s) information will not be sent to the TE until the MT has received a message of successful authentication from the TE or the MT has decided that the message forwarded by the TE is a message of successful authentication. As a result, not only the procedure is made more reasonable, but the network resources are saved. In addition, the MT may decide according to the user's operation whether to add the TE initiating the request to the management list.

Alternatively, it is possible to modify only the procedure on the basis of the prior art and add a management list of local TEs identities on the basis of the modified procedure so as to further implement the management of the TE accessing the network using the resources of the MT.

In the above embodiment, the network has not defined a limit of the number of the TEs that one MT can serve. If the network defines such a limit, then in Step 404, the MT will first decide whether the MT itself is serving the number of the TE as limited by the network, if yes, just refuse to provide service for the TE, otherwise continue with the subsequent steps.

As can be seen from the above procedure, after completing the authentication using the MT and the USIM/ISIM/SIM, the TE will no longer maintain a connection with the MT except during re-authentication and logoff. Therefore, if the MT is taken away or switched off at this time, the MT will not receive the logoff notice sent to the MT from the TE. In other words, in some cases, the MT may not be able to update the state information of the TE in time. As a result, a severe drawback will appear when the network allows only a limited number of connections. Thus, the MT needs a self-protection mechanism to avoid rejecting the access of other TE when the network allows only a limited number of connections. The specific mechanism of protection may take the two approaches as follows:

Approach one: setting a timer. When not having received the logoff notice from the TE identified as in the online state for a preset period of time, the MT will modify the state information of the TE, making the information indicating the unused state, i.e., the idle state. The feature of this approach is: the MT triggers a modification, i.e., as long as the set timer is timed-out, the MT will detect and modify the state information of the TE in the management list for which the set time is out.

Approach two: stamping the time on the modified state information. The MT, when receiving a new authentication identity request and deciding according to the current state information of the TE in the management list that the MT itself is serving the number of the TE as limited by the network, will further decide whether the difference between the current time and the time indicated by the time stamp on the state information has exceeded the preset time threshold, if yes, modify the state information of the TE, making the information indicate the unused state, i.e., the idle state, otherwise make no change and refuse to serve the new TE. The feature of this approach is: the MT triggers a modification passively, i.e., the MT will not make detection until having received a request from the TE, and modifies the state information of the TE for which the set time is out.

The foregoing is only preferred embodiments of this invention and is not used for limiting the invention. Any modification, equivalent substitution, or improvement without departing from the spirit and principle of this invention should be covered by the protection scope as defined by the appended claims of this invention.

What is claimed is:

1. A method for managing a local terminal equipment (TE) accessing a network through a mobile terminal (MT), wherein a user identity card having an identity is coupled with the MT, the method comprising:
   receiving, by the MT, an authentication request identity message from the local TE;
   acquiring, by the MT, the identity of the user identity card and returning the identity of the user identity card to the local TE, so that the local TE performs authentication with the network by using the identity of the user identity card;
   receiving, by the MT, an authentication request message forwarded by the local TE from the network;
   returning, by the MT, an authentication response message containing an authentication response value to the local TE, wherein the authentication response message is forwarded from the local TE to the network;
   receiving, by the MT, the information of the authentication result forwarded by the local TE from the network; and
   when the received information of the authentication result indicates that the authentication process is successful, sending, by the MT, key information to the local TE, wherein the key information is used by the local TE in accessing the network; otherwise, not sending key information to the local TE.

2. The method according to claim 1, wherein the user identity card is a subscriber identity module (SIM) of a global system for mobile communications (GSM), a universal subscriber identity module (USIM) of a third generation system for mobile communications, or an Internet protocol (IP) multimedia subsystem subscriber identity module (ISIM) of an IP multimedia subsystem.

3. A mobile terminal (MT), wherein a user identity card having an identity is coupled with the MT, the MT comprising:
   a receiver, configured to receive an authentication request identity message from a local terminal equipment (TE), receive an authentication request message forwarded by the local TE from the network, and receive the information of the authentication result forwarded by the local TE from the network;
   a processor, configured to:
   acquire the identity of the user identity card and return the identity of the user identity card to the local TE in response to receiving by the receiver the authentication request identity message, so that the local TE performs authentication with the network by using the identity of the user identity card;
   return an authentication response message containing an authentication response value to the local TE in response to receiving the authentication request message, wherein the authentication response message is forwarded from the local TE to the network; and
   determine whether the received information of the authentication result indicates that the authentication process is successful; and
   a transmitter, configured to send key information to the local TE only when the received information of the authentication result indicates that the authentication process is successful, wherein the key information is used by the local TE in accessing the network.

4. The mobile terminal according to claim 3, wherein the user identity card is a subscriber identity module (SIM) of a global system for mobile communications (GSM), a universal subscriber identity module (USIM) of a third generation system for mobile communications, or an Internet protocol (IP) multimedia subsystem subscriber identity module (ISIM) of an IP multimedia subsystem.

* * * * *